A. Bennett.
Cultivator.

Nº 73224. Patented Jan. 14, 1868.

Witnesses
Thos Fusche
J. A. Service

Inventor
A. Bennett
Per Munn & Co.
Attorneys

United States Patent Office.

A. BENNETT, OF ROCKFORD, ILLINOIS.

Letters Patent No. 73,224, dated January 14, 1868; antedated January 4, 1868.

---

IMPROVEMENT IN CULTIVATORS.

---

*The Schedule referred to in these Letters Patent and making part of the same.*

---

TO ALL WHOM IT MAY CONCERN:

Be it known that I, A. BENNETT, of Rockford, in the county of Winnebago, and State of Illinois, have invented a new and useful Improvement in Cultivators; and I do hereby declare that the following is a full, clear, and exact description thereof; which will enable others skilled in the art to make and use the same, reference being had to the accompanying drawings, forming part of this specification, in which—

Similar letters of reference indicate like parts.

Figure 1:
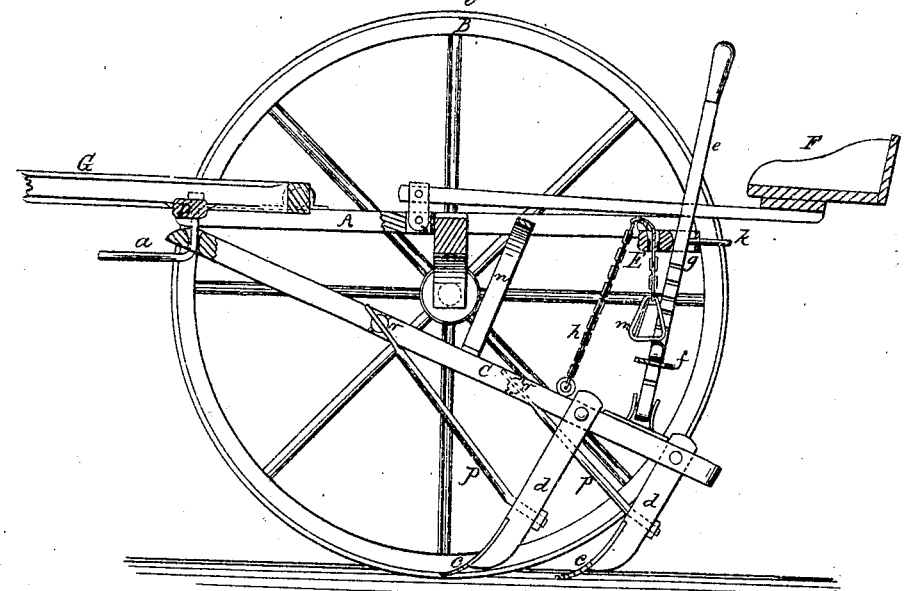
Figure 1 is a vertical longitudinal section of my improved cultivator, taken in the line $x\ x$, fig. 2.
Figure 2:
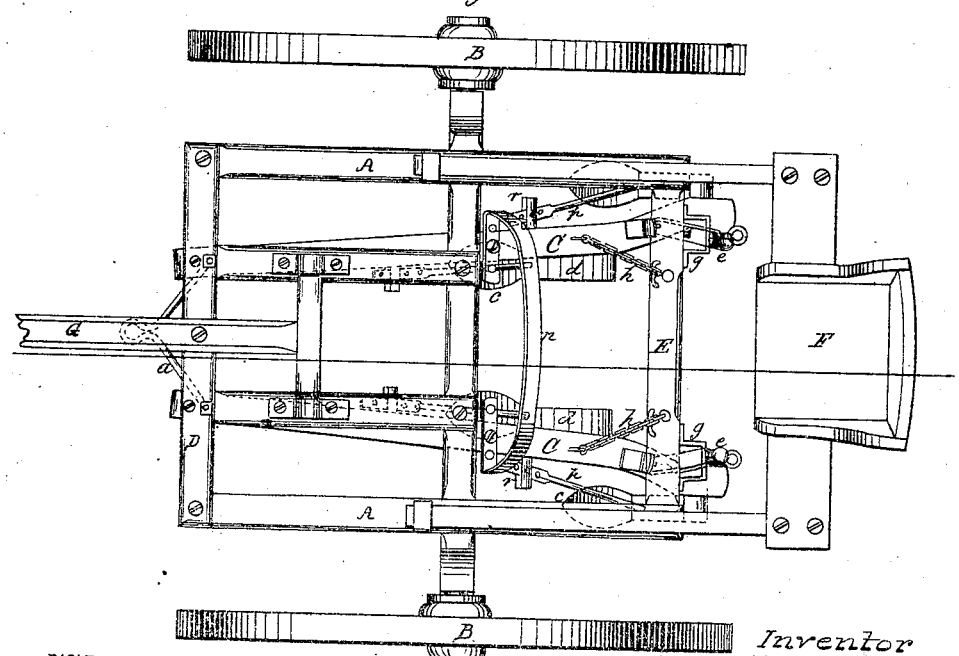
Figure 2 is a top view.

This invention relates to improvements in corn-cultivators, and consists in the combination and arrangement of a sulky-frame mounted on two wheels, and double plough-beams attached thereto, for the shovels to work on both sides of a row of corn, in such a manner as to be entirely under the control of the driver in his seat, who, with his feet, is enabled to adjust the shovels laterally in either direction, to adapt them to follow crooked rows of plants and "dodge" stones or other obstructions which might damage the machine by striking against the shovels. Devices for adjusting the depth of the shovels, and other purposes, are also provided, by which my improved cultivator is operated with great ease by a common farm-hand or boy, to perform the work of cultivating corn with dispatch and thoroughness.

A A are the side beams of a carriage-frame mounted on wheels B B. C C are plough-beams, connected at the front ends by an iron hitching-rod, $a$, the middle of which is bent to form an eye or loop for hitching the double-tree, and the ends of which are fastened to the front cross-beam D, and pass through holes in the ends of the plough-beams in such manner that they can vibrate laterally in either direction. The shovels $c\ c$ are attached to each of the stocks $d\ d$, one inside and the other outside, to work on both sides of the row of corn nearer and farther from the hills. An upright hand-lever, $e$, is hinged or pivoted to each of the plough-beams, and passes up through caps or staples $g$, on the rear cross-beam E, to which they are each secured by a pin, $k$, put through any one of a series of holes in the lever for holding the plough-beams with the shovels, at any required height. Movable steps, $f$, are attached to the levers $e$, and held upon them by notches in the sides of the levers to support the feet of the driver while in the seat F, and enable him to control and move the shovels laterally either way, which movements of the levers may also be made with the hands. A chain, $h$, is also attached to each plough-beam, which passes over the rear cross-beam E, and on the end of each chain is suspended a stirrup, $m$, by which the driver can raise the shovels from the ground, as desired, after releasing the levers $e$, by removing the pins $k$. The plough-beams C C are connected by a semicircular brace-plate or rod, $n$, having holes in the ends to fasten it to the beams and regulate their distance apart; and the plough-stocks or standards $d$ are pivoted at their upper ends to the plough-beams C, and are connected also with the beams by adjustable braces $p\ p$, the upper ends of which are held in slotted bolts $r\ r$, by wooden pins, which pass through any one of a series of holes in the ends of the braces, to give the shovels more or less pitch. The pins are made of wood, so that when the shovels strike any hard substance, the pins shall break without injury to any other part of the machine.

Having described my invention, I claim as new, and desire to secure by Letters Patent—

1. The hitching-iron $a$, in combination with the plough-beams C C, and the front cross-beam D, arranged and operating substantially as and for the purposes herein described.

2. I claim also the chain $h$, with the stirrup $m$, at one end, connected with the plough-beams C C at the other end, and passing over the rear cross-beam E, to raise the beams and shovels, as described.

3. I claim also the upright hand-levers $e\ e$, hinged or pivoted to the plough-beams C C, and passing through the staples $g\ g$ on the cross-beam E, to which they are secured by pins $k\ k$, arranged and operating as and for the purposes described.

4. I claim also the movable foot-pieces or steps $f$, on the levers $e\ e$, held in place by notches in the sides of the levers, as and for the purpose specified.

5. The adjustable braces $p\ p$ and slotted bolts $r\ r$, arranged in relation with the beams C and standard $d$, to regulate the pitch of the shovels, as herein shown and described.

A. BENNETT.

Witnesses:
THOMAS SULLY,
O. A. PENNOYER.